US011227002B2

(12) United States Patent
Hassanzadeh et al.

(10) Patent No.: US 11,227,002 B2
(45) Date of Patent: Jan. 18, 2022

(54) METHOD AND APPARATUS FOR IDENTIFYING SEMANTICALLY RELATED RECORDS

(71) Applicant: International Business Machines Corporation, Armonk, NY (US)

(72) Inventors: Oktie Hassanzadeh, Port Chester, NY (US); Anastasios Kementsietsidis, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 687 days.

(21) Appl. No.: 14/954,664

(22) Filed: Nov. 30, 2015

(65) Prior Publication Data
US 2017/0154052 A1    Jun. 1, 2017

(51) Int. Cl.
*G06F 16/35* (2019.01)
*G06F 16/215* (2019.01)

(52) U.S. Cl.
CPC ............ *G06F 16/35* (2019.01); *G06F 16/215* (2019.01)

(58) Field of Classification Search
CPC ......... G06F 17/30598; G06F 17/30705; G06F 17/30672; G06F 17/30734; G06F 16/35; G06F 16/215
See application file for complete search history.

(56) References Cited

U.S. PATENT DOCUMENTS

| 8,468,160 | B2 | 6/2013 | Hassanzadeh et al. |
| 2003/0177112 | A1* | 9/2003 | Gardner ................. G06F 19/28 |
| 2005/0108001 | A1* | 5/2005 | Aarskog ............... G06F 17/271 704/10 |
| 2010/0114899 | A1* | 5/2010 | Guha ................ G06F 17/30867 707/741 |
| 2013/0013645 | A1 | 1/2013 | Dias et al. |
| 2015/0331936 | A1* | 11/2015 | Alqadah ............... G06F 17/277 707/739 |
| 2016/0188570 | A1* | 6/2016 | Lobez Comeras ..... G06F 17/28 704/9 |

* cited by examiner

*Primary Examiner* — James Trujillo
*Assistant Examiner* — Kurt A Mueller
(74) *Attorney, Agent, or Firm* — Peter Edwards, Esq.; McGinn I.P. Law Group, PLLC

(57) ABSTRACT

An apparatus and method of identifying semantically related records, including receiving input data from an input device, splitting the input data into a plurality of clusters according to semantic relationship, each of the clusters including a plurality of source terms and a plurality of target terms, transforming each of the plurality of clusters based on the transformation which includes tokenization of the plurality of clusters, for each of the plurality of clusters that are transformed, finding relatedness scores of a plurality of semantic relatedness measures with the plurality of target terms, building a vector of similarity scores for each of the plurality of target terms, and for each of the plurality of source terms, selecting a predetermined number of the plurality of target terms according to the similarity scores.

8 Claims, 11 Drawing Sheets

102

| NAICS standard | |
|---|---|
| Code | Description |
| 111110 | Soybean Farming |
| 111120 | Oilseed (except Soybean) Farming |
| 111331 | Apple Orchards |
| 111332 | Grape Vineyards |
| 111333 | Strawberry Farming |
| 112512 | Shellfish Farming |

104

| NACE standard | |
|---|---|
| Code | Description |
| 1.11 | Growing of cereals and other crops n.e.c. |
| 1.13 | Growing of fruit, nuts, beverage and spice crops |
| 5.02 | Fish Farming |

FIG. 1

| NAICS standard | |
|---|---|
| Code | Description |
| 111110 | Soybean Farming |
| 111120 | Oilseed (except Soybean) Farming |
| 111331 | Apple Orchards |
| 111332 | Grape Vineyards |
| 111333 | Strawberry Farming |
| 112512 | Shellfish Farming |

102

| NACE standard | |
|---|---|
| Code | Description |
| 1.11 | Growing of cereals and other crops n.e.c. |
| 1.13 | Growing of fruit, nuts, beverage and spice crops |
| 5.02 | Fish Farming |

104

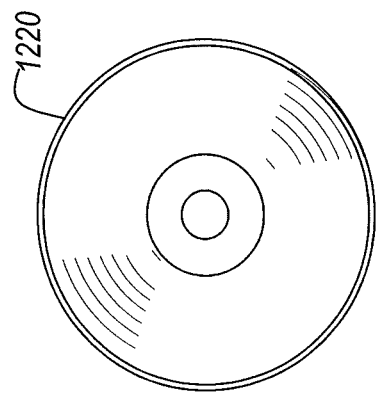
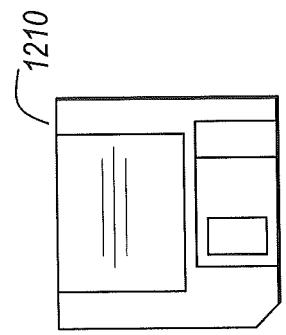
FIG. 8

METHOD AND APPARATUS FOR IDENTIFYING SEMANTICALLY RELATED RECORDS

BACKGROUND OF THE INVENTION

Field of the Invention

The disclosed invention relates generally to method and apparatus to identify records, and more particularly, but not by way of limitation, relating to a method and apparatus for method and apparatus for identifying semantically related records.

Description of the Related Art

Generally, record matching, or finding records in a database that refer to the same entity or have a semantic relationship, is a challenging problem faced in many increasingly important data management applications. This task is often considered a critical part of data cleaning tools and ETL (Extract, Transform, Load) technologies. On the other hand, there is an increasing need for record matching in semantic data management and the semantic Web. Accurate and efficient matching of data records allows publication and maintenance of high-quality data sources and avoids creation of "islands of data" or "data silos", a problem well recognized in the semantic Web community.

Existing record matching techniques perform matching based on either string similarity, (ontology-based) semantic relationships, existence of co-occurrence information or limited combinations thereof.

However, these techniques sometimes fail to capture many similarities occurring in real world matching and linking scenarios, or often result in false positives (i.e., match records that do not match). As supported by real world tests in matching and linking records in many real data sets, a major source of the failure of existing techniques is lack of a flexible matching and issues regarding the accuracy in the links provided in the matching.

SUMMARY OF INVENTION

In view of the foregoing and other problems, disadvantages, and drawbacks of the aforementioned background art, an exemplary aspect of the disclosed invention provides a system and method of providing identification of semantically related records.

One example aspect of the disclosed invention provides a method of identifying semantically related records, including splitting input data record into clusters according to semantic relationship, taking as input at least two sets of records in one cluster from among the clusters and transforming each record in source and target into a set of terms through the transformations, for each pair of set of terms, starting from a longer set and for each term, finding relatedness scores of various semantic relatedness measures with all terms in the other set to build a vector of similarity scores for each target term, and for each record in source, selecting top-k (where k is an integer greater than zero) similar records in the target according to the similarity scores derived and return as output.

The splitting includes splitting the input data records into the clusters that are more likely to be semantically related. The transformations include tokenization, conversion to lowercase, and removal of stop words. The tokenization further comprises extending a first set of tokens to create an extended first set of tokens and a second set of tokens to create an extended second set of tokens based on a received semantic knowledge. There can also be receiving a set of weight values related to the extended first and second sets of extended tokens and calculating a similarity score for the extended first and second sets of extended tokens based on the received weight values. The transformations includes taking an initial input and breaking into smaller parts, and taking the smaller parts and semantically extended to a set of words that are related to the initial input. The smaller parts are semantically extended by dictionary or ontology. The method can be an executable program stored in a computer readable medium and executed by a processor. The method can also be an executable program stored in a computer readable medium on cloud-based virtual server.

Another example aspect of the disclosed invention provides a method of identifying semantically related records, including taking input records and transforming each record in source and target into a set of terms through the transformations, for each pair of set of terms, starting from a longer set and for each term, finding its relatedness scores of various semantic relatedness measures with all terms in the other set to build a vector of similarity scores for each target term, and for each record in source, selecting top-k (where k is an integer greater than zero) similar records in the target according to the similarity scores derived and return as output.

The method can also include splitting the input data records into the clusters that are more likely to be semantically related. The transformations include tokenization, conversion to lowercase, and removal of stop words. The tokenization further comprises extending a first set of tokens to create an extended first set of tokens and a second set of tokens to create an extended second set of tokens based on a received semantic knowledge. There can also be receiving a set of weight values related to the extended first and second sets of extended tokens and calculating a similarity score for the extended first and second sets of extended tokens based on the received weight values. The transformations include taking an initial input and breaking into smaller parts, and taking the smaller parts and semantically extended to a set of words that are related to the initial input. The smaller parts are semantically extended by dictionary or ontology. The method can be an executable program stored in a computer readable medium and executed by a processor. The method can also be an executable program stored in a computer readable medium on cloud-based virtual server.

In another example aspect of the invention, there is an apparatus for identifying semantically related records, including a computer readable medium storing a program, and a processor executing the program, wherein the processor takes input records and transforming each record in source and target into a set of terms through the transformations, wherein for each pair of set of terms, the processor starts from a longer set and for each term, find its relatedness scores of various semantic relatedness measures with all terms in the other set to build a vector of similarity scores for each target term, and wherein for each record in source, the processor selects top-k (where k is an integer greater than zero) similar records in the target according to the similarity scores derived and return as output. The transformations include tokenization, conversion to lowercase, and removal of stop words.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 1 illustrates example data sources.

FIG. 8 illustrates a signal-bearing storage medium for storing machine-readable instructions of a program that implements the method according to the exemplary embodiment of the invention.

DETAILED DESCRIPTION OF A PREFERRED EMBODIMENTS

Figure 2:
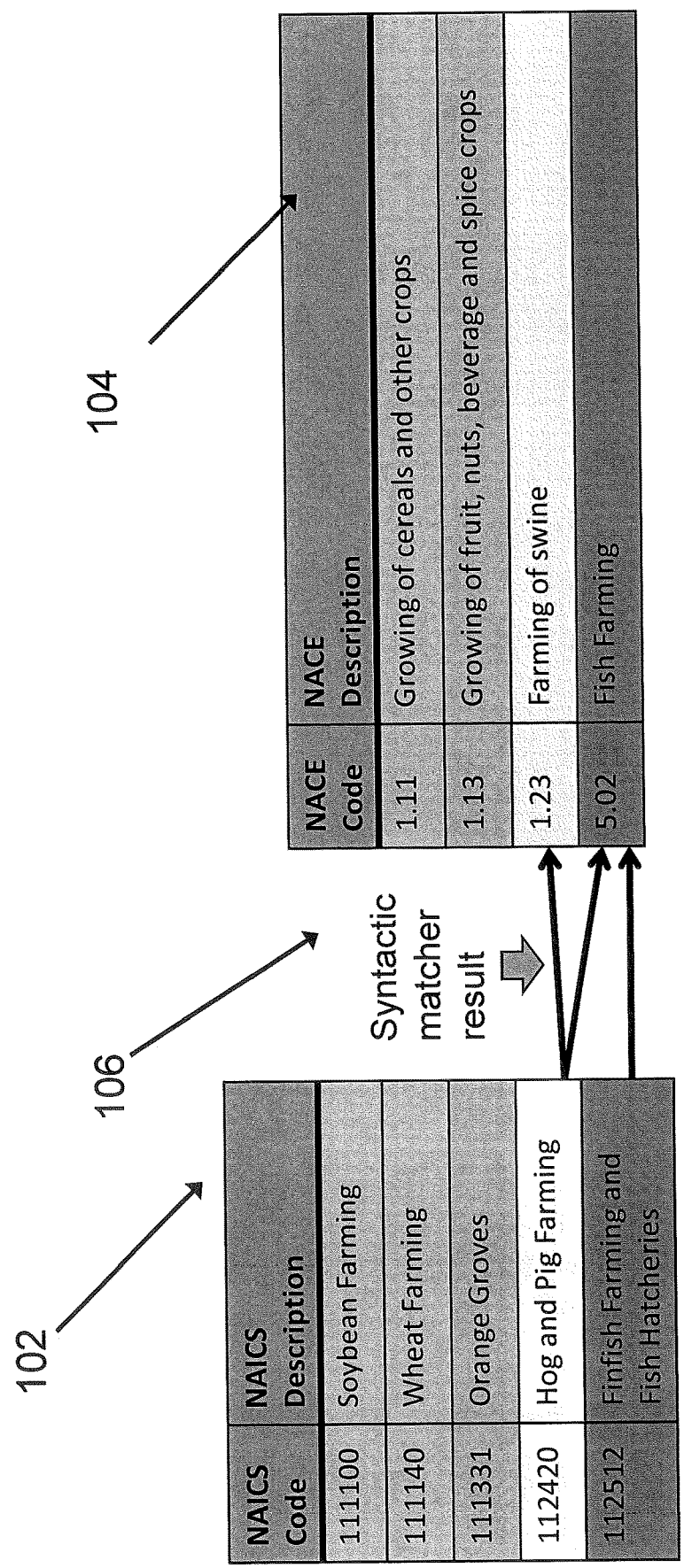
FIG. 2 shows sample relations between records across a plurality of data sources.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Record Linkage (also known as Entity Resolution or Duplicate Detection) is a classic problem during the integration of heterogeneous sources. In real-life scenarios, different sources commonly use different methods (schemas, identifiers, descriptions) to store often identical data. It is the job of entity/record matchers to figure out which data in these different sources describe the same real—world entity.

A simple real-life example that illustrates this common problem involves just two sources, one storing industry codes according to a US-based standard, the North American Industry Classification System (NAICS), and another source that stores industry codes based on a European standard, namely NACE. FIG. 1 shows samples from these two sources of NAICS standard 102 and NACE standard 104.

Ideally, one would like to use these standards interchangeable and be able to understand which industries from one standard correspond to industries to the other. This requires that identification of which entries in the two standards talk about the same (or highly relevant) industries. Typical techniques in the area of record linkage (e.g. tokenization and use of vector space similarity functions) mostly rely on the syntax of the entries and try to match the entries by matching their corresponding strings.

Such techniques would fail here for multiple reasons. An obvious reason is that the two standards use different vocabularies to describe industries. For example, the NACE standard 104 talks about fruits in general as an industry, while the NAICS standard 104 is more detailed and talks about Grapes, Strawberries and Apples. So although in the NAICS standard 102 the code 111331 maps to entry code 1.13 in the NACE standard 104, there is little to no similarity between the two entries at the syntactic level.

So, incorporating semantics is an important factor in matching entries such as the ones shown here. Still, existing semantic entity identification techniques mostly assume that the semantic methods are applied over single-word descriptions to infer record similarity. Therefore, it is assumed that the fields that are semantically extended to infer record linkage are mostly single-word fields.

Referring to FIG. 2, due to different vocabularies, the syntactic mapper 106 returns no mappings for the first three entries of NAICS standard 102 and first two entries of the NACE standard 104. Because of the term "farming" in NAICS code 112420, the syntactic mapper is unable to discern the difference between fishes and pigs as seen in the link provided from the syntactic mapper 106.

As such, such methods do not work for multi-word long descriptions like the columns shown in the example above. Simple combination of existing techniques (e.g., taking average similarity for all pairs of words) would fail in practice due to a number of reasons including the need for a large number of comparisons, similarity scores that are not normalized and comparable, and being very sensitive to the choice of similarity threshold per each comparison.

One idea in the disclosed invention is that it introduces a linking approach to semantically identify related records in different sources, records that often include multi-word long descriptions. The disclosed invention uses a tokenizer to break initially these long descriptions into individual words. Each of these individual words is semantically extended (for example by means of a dictionary or ontology) to a set of words that are related to the initial word.

Figure 3:
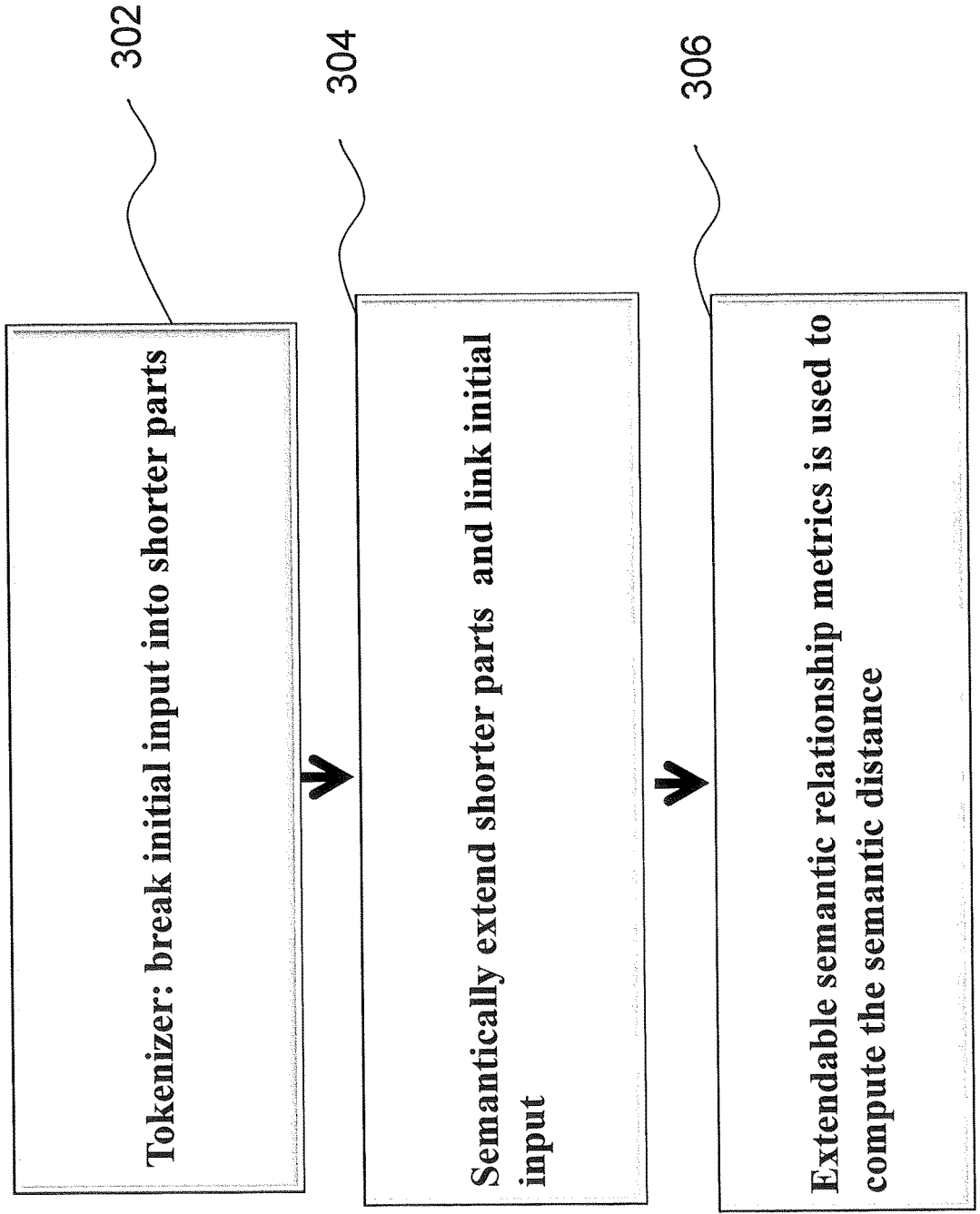
FIG. 3 is a flowchart of a part of the present technique, according to an example embodiment.

Referring to FIG. 3, using a tokenizer, the initial input of a long description can be broken up into smaller parts, such as the individual words in step 302. Then in step 304, the smaller parts or individual words are semantically extended (for example by means of a dictionary or ontology) to a set of words that are related to the initial word.

From an example, by tokenizing "Soybean Farming" the work of "Farming" from step 302 is identified and is father extended to the set of words "farming, agriculture, husbandry, farm, grow, raise, produce" in step 304. These extended sets of words can be thought of as additional ways to describe the original "Farming" word that appears in the descriptions of the records. When each word is extended in both sources, a whole set of extendable semantic relationship metrics is used to compute the semantic distance between words that appear in two records of the two sources in step 306.

A tokenizer is used to break initially these long descriptions into individual words. Each of these individual words is semantically extended (by means of a dictionary or ontology) to a set of words that are related to the initial word. From example, by tokenizing Soybean Farming" the work "Farming" is identified and is father extended to the set of words "farming, agriculture, husbandry, farm, grow, raise, produce". These extended sets of words can be thought of as additional ways to describe the original "Farming" word that appears in the descriptions of the records. When each word is extended in both sources, a whole set of extendable semantic relationship metrics is used to compute the semantic distance between words that appear in two records of the two sources. For example, the semantic distance is computed between the "farming" word in NAICS and "growing" word in NACE. In the present implementation, at least 8 different metrics are used and therefore the present implementation computes the semantic distance between "farming" and "growing" along at least 8 dimensions resulting in a vector of 8 entries. The vector of multiple words that appear in a record can be composed together to result in a combined similarity score between the records in which these words appear. At the end, the program returns the matched records with the highest semantic matching scores.

For example, the semantic distance is computed between the "farming" word in the NAICS standard 102 and "growing" word in the NACE standard 104. In an example implementation of the disclosed invention, at least 8 different metrics are used and therefore the present implementation computes the semantic distance between "farming" and "growing" along at least 8 dimensions resulting in a vector of at least 8 entries in step 306.

The vector of multiple words that appear in a record can be composed together to result in a combined similarity score between the records in which these words appear. At the end, the program returns the matched records with the highest semantic matching scores in step 306.

Unlike existing semantic-aware record matching approaches, the method of the disclosed invention is fully unsupervised and does not require setting a similarity threshold value for syntactic or semantic matching of terms.

The disclosed invention can be implemented in JAVA or other type of implementations. An example implementation can use the open-source WORDNET ONTOLOGY to semantically extend words that appear in records, and can use an extensible library of algorithms to compute semantic distances between words, with respect to the WORDNET dictionary.

Figure 4:
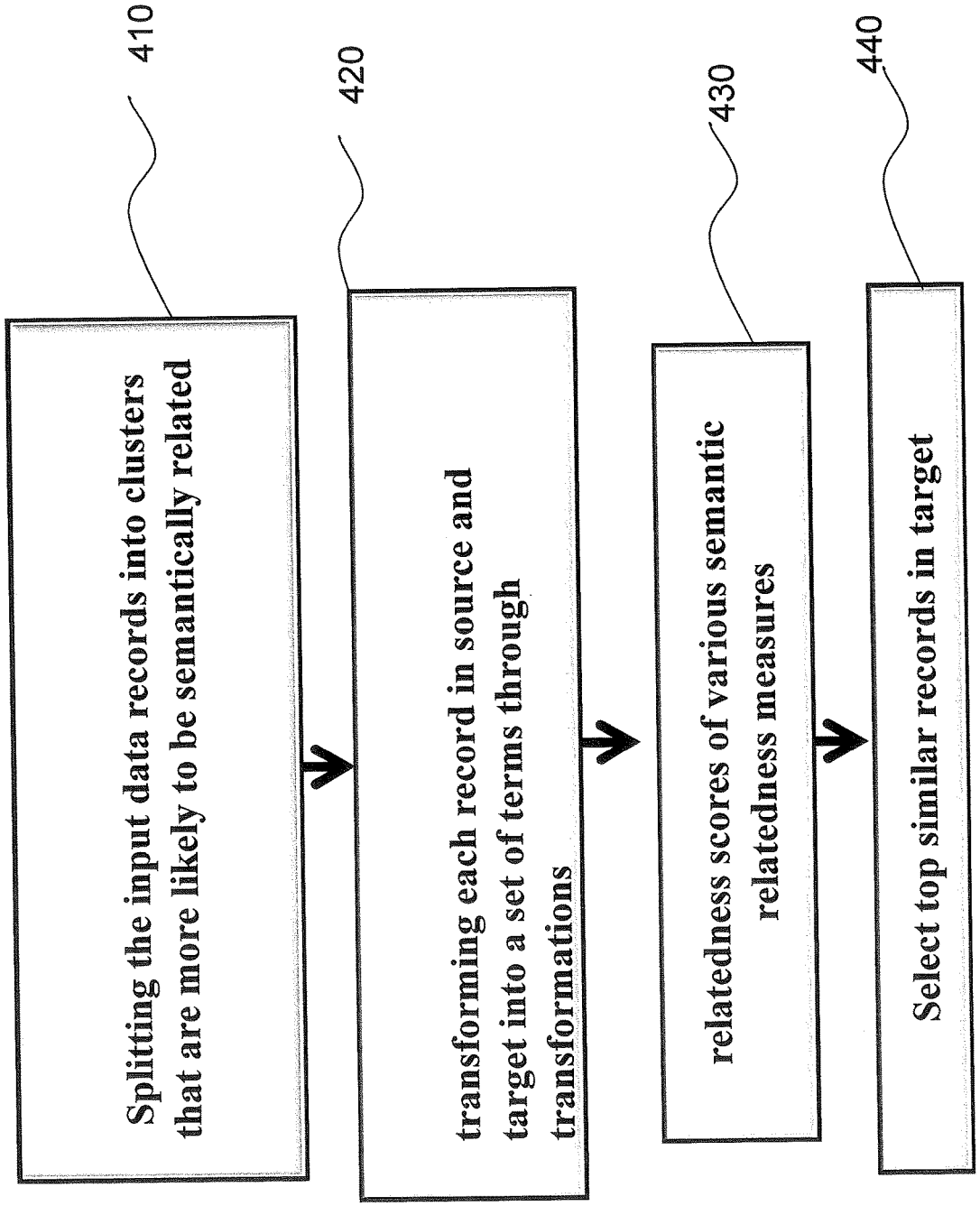
FIG. 4 is a flowchart of a technique of semantically relating records, according to an example embodiment.

Therefore, a detailed example technique of the disclosed invention includes the following limitations in FIG. 4.

First, splitting the input data records into clusters that are more likely to be semantically related in step 410. This step 410 can be optional. Step 410 allows to avoid expensive similarity computation when there is evidence that the records are most likely not related. In an example, a good clustering will put together the records that contain terms "farming" and "growing" in the same cluster, but will avoid putting records that contain the term "mining" in the same cluster as this term indicates that the industries are different and further comparison of the other terms is not needed.

Second, taking as input two sets of records in one cluster (or all the input records in case the first step 410 is skipped) and transforming each record in source and target into a set of terms through transformations such as tokenization, conversion to lowercase, and removal of stop words (frequent terms like "the", "and", etc.) (Step 420).

Third, for each pair of sets of terms, start from the longer set and for each term, find its relatedness scores of various semantic relatedness measures with all the terms in the other set to build a vector of similarity scores for each target term (Step 430). Pick the term with the highest similarity score vector magnitude as a match. Repeat until a set of matches from all terms in the source string are found. Treat the match magnitudes as a vector and compute the magnitude of the resulting vector as the similarity score between the records with the corresponding sets of terms.

For each record in source, pick the top-k (where k is an integer greater than zero) similar records in target according to the scores derived in step 430 and return them as output (Step 440).

Figure 5:
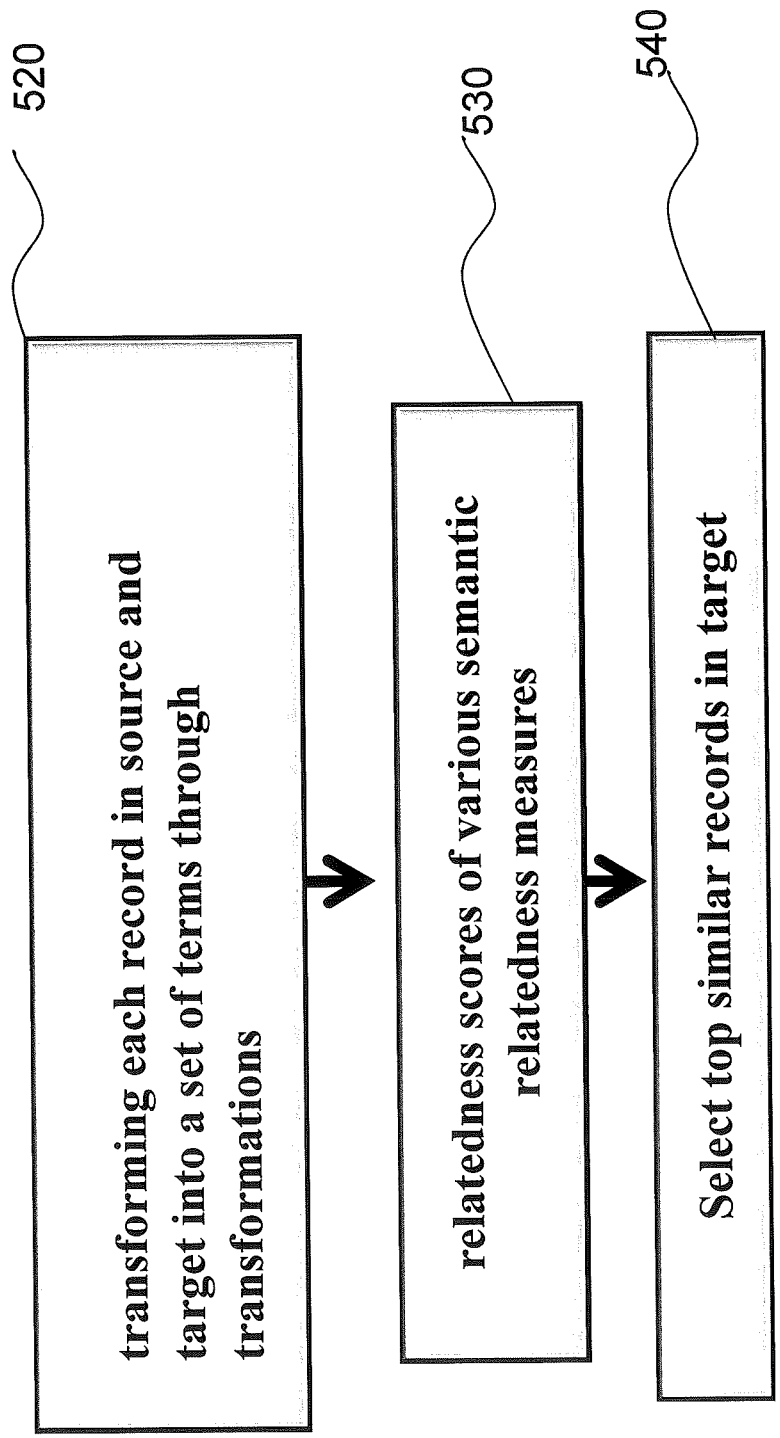
FIG. 5 is a flowchart of another technique of semantically relating records, according to an example embodiment.

FIG. 5 shows another example of disclosed invention with one of the steps from FIG. 4 removed.

Referring to FIG. 5, first the technique includes taking as input all the input records (where the first step 410 in FIG. 4 is skipped) and transforming each record in source and target into a set of terms through transformations such as tokenization, conversion to lowercase, removal of stop words (frequent terms like "the", "and", etc.) (Step 520).

Second, for each pair of sets of terms, start from the longer set and for each term, find its relatedness scores of various semantic relatedness measures with all the terms in the other set to build a vector of similarity scores for each target term (Step 530). Pick the term with the highest similarity score vector magnitude as a match. Repeat until a set of matches from all terms in the source string are found. Treat the match magnitudes as a vector and compute the magnitude of the resulting vector as the similarity score between the records with the corresponding sets of terms.

For each record in source, pick the top-k (where k is an integer greater than zero) similar records in target according to the scores derived in step 430 and return them as output (Step 540).

Figure 6:
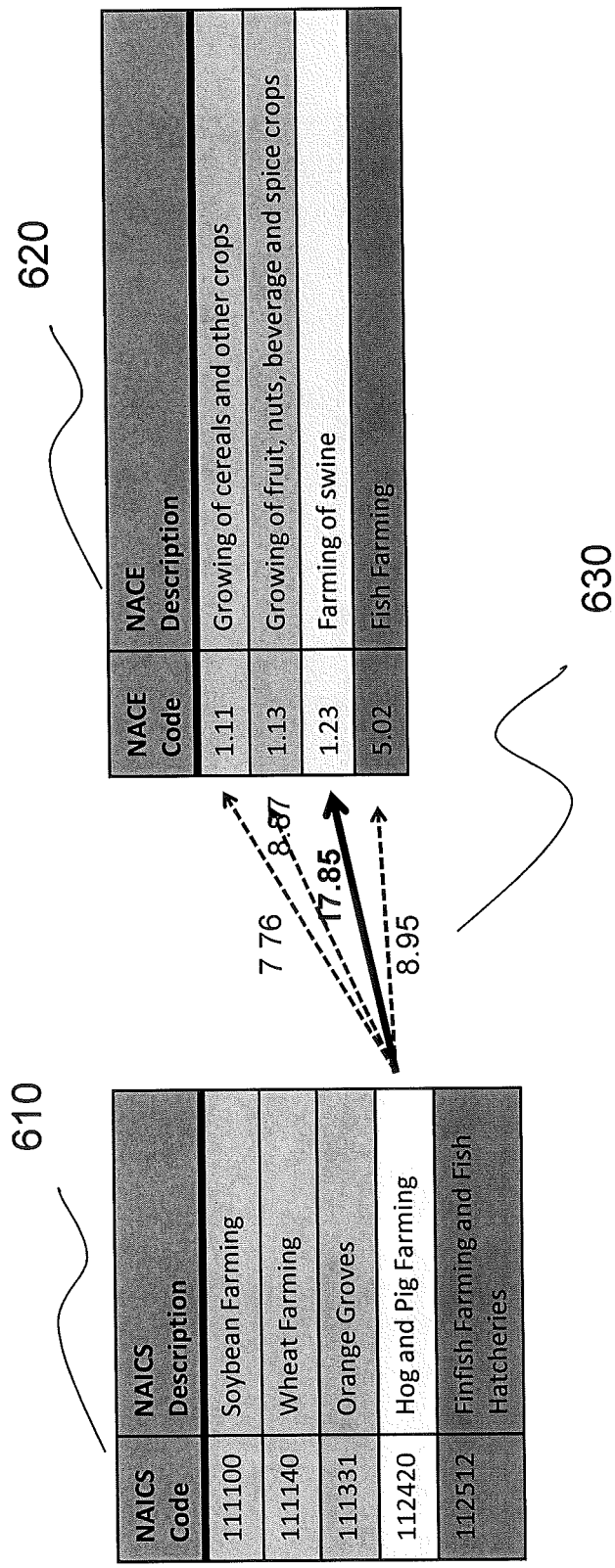
FIG. 6 illustrates a result of the technique of semantically relating records, according to an example embodiment.

A real world example can be found in the following FIG. 6. The links 630 provide an accurate mapping between the NAICS code 610 and NACE code 620. Therefore, the technique of the disclosed inventions builds a semantic mapper that employs, for example WordNet, and uses at least eight (8) independent measures of word-closeness, to define the closeness of records based on their descriptions as seen in the example numbers provided to show the closeness in the mapping 630.

Therefore, the disclosed invention provides an exploration of alternative word meanings to determine closeness between words. Additionally, there is a definition of a record mapping as a (optimal) subjective function between word sets. A function is subjective (onto) if every element of the codomain is mapped to by at least one element of the domain. That is, the image and the codomain of the function are equal. Additionally, there is a normalization of mapping weights based on mapping popularity. Moreover, there are several performance improvements including a map-reduce implementation.

The present technique has shown in real-world record matching where it not only outperforms existing syntactic matching approaches, it outperforms state-of-the-art semantic matching techniques.

Exemplary Hardware and Cloud Implementation

Figure 7:
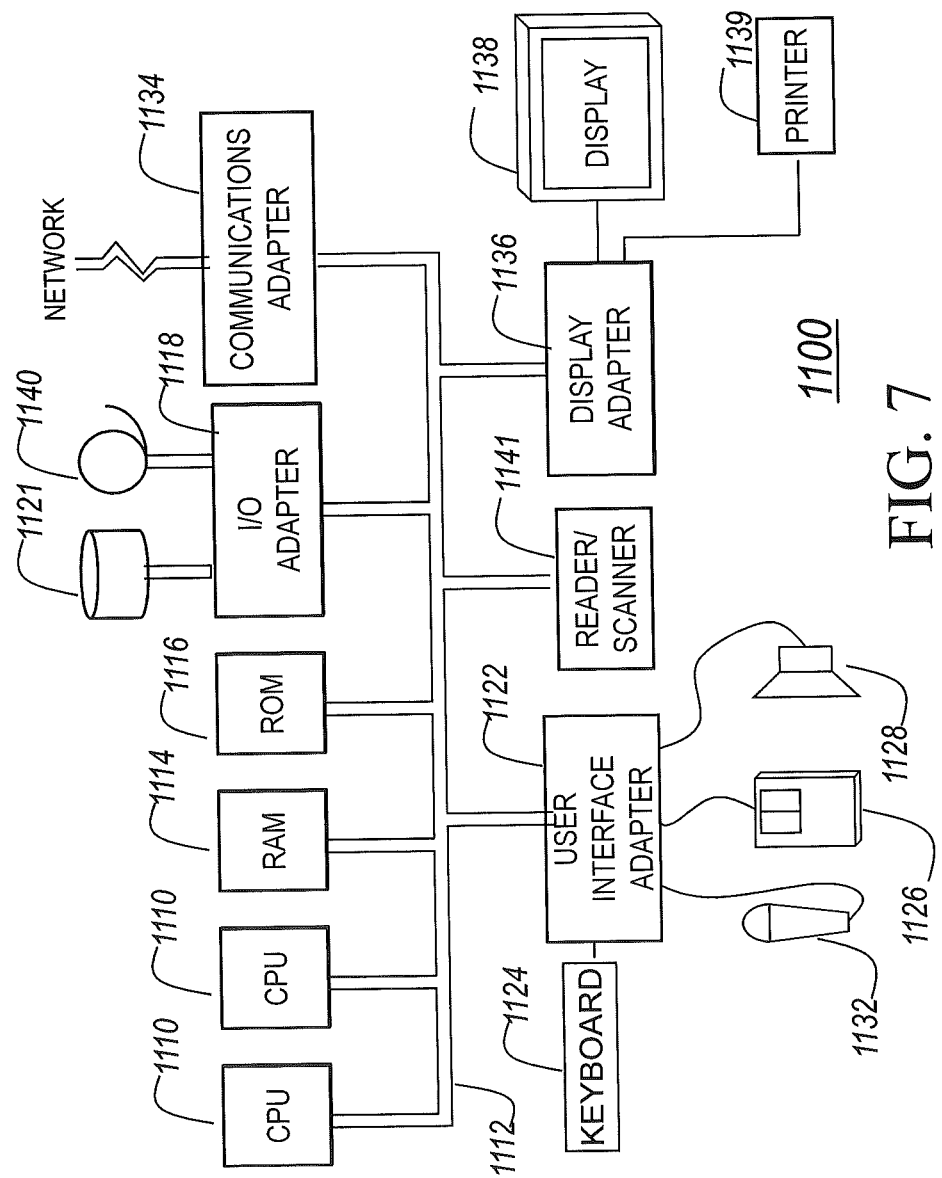
FIG. 7 illustrates an exemplary hardware/information handling system for incorporating the exemplary embodiment of the invention therein.

FIG. 7 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a magnetic data storage diskette 1210 or optical storage diskette 1220 (FIG. 8), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
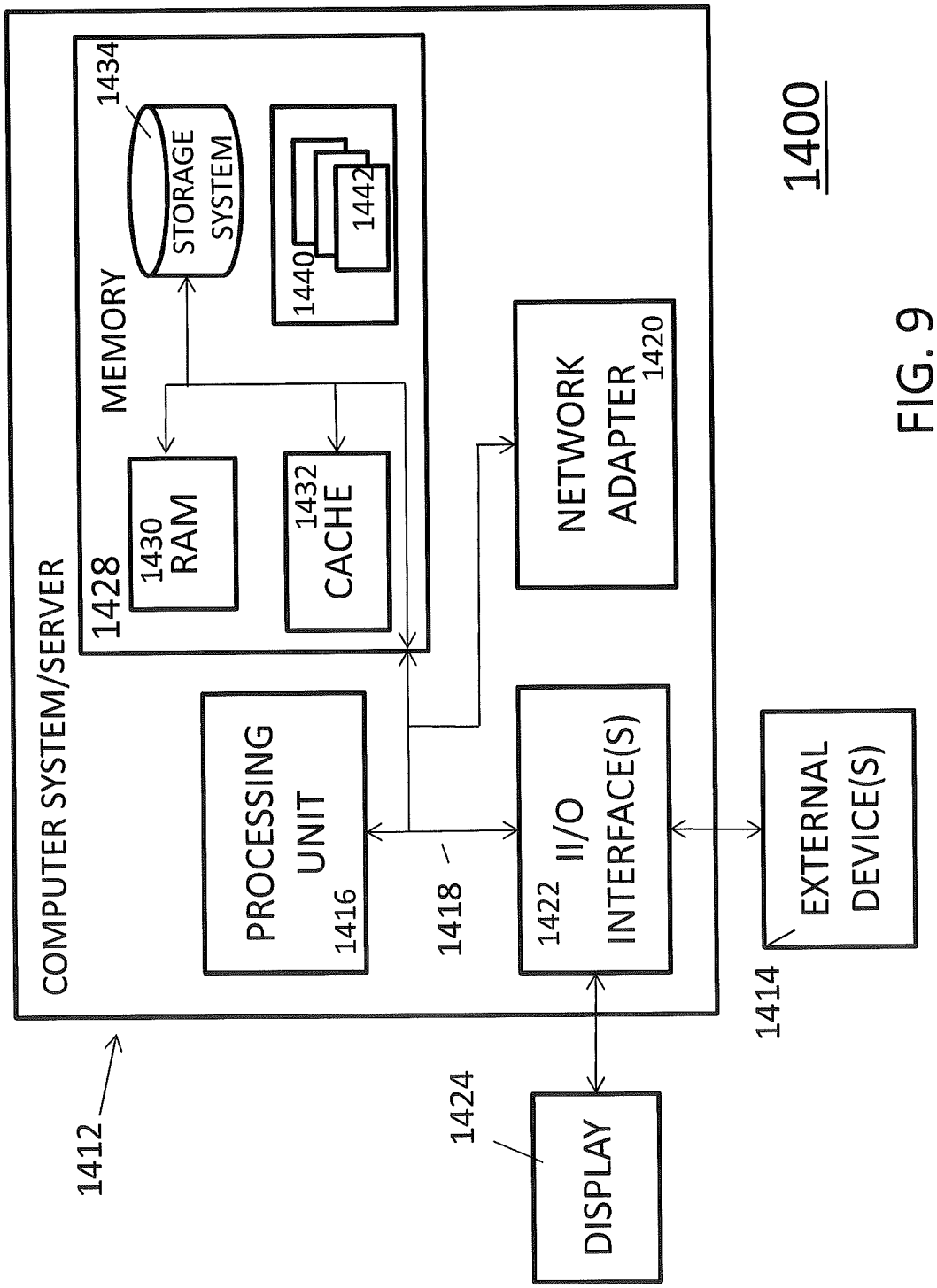
FIG. 9 depicts a cloud computing node according to an embodiment of the present invention.

Referring now to FIG. 9, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 10:
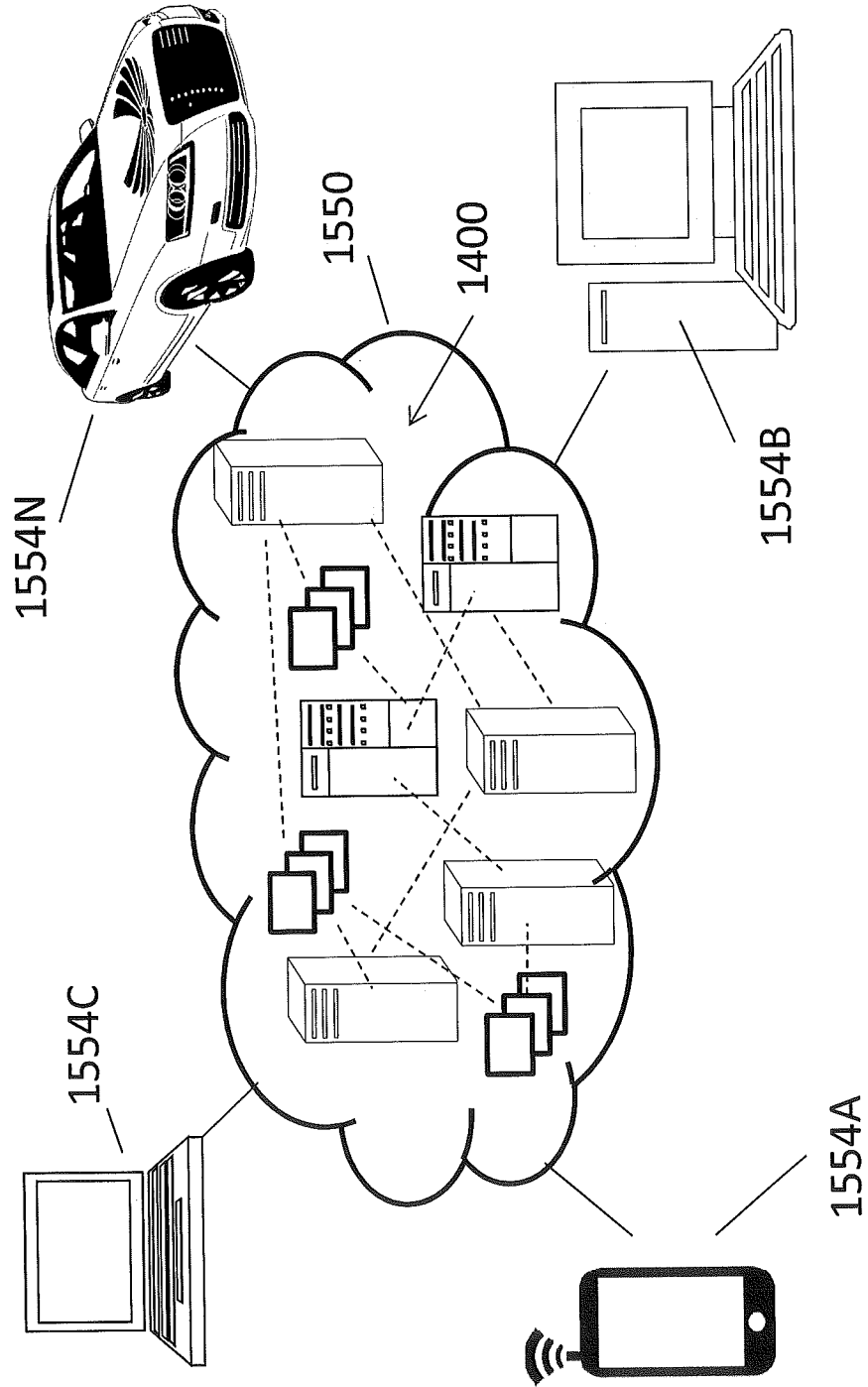
FIG. 10 depicts a cloud computing environment according to an embodiment of the present invention.

Referring now to FIG. 10, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 10 are intended to be illustrative only and that computing nodes 1400 and cloud computing environment 1550 can communicate with any type of computerized device over any type of network and/or network addressable connection (e.g., using a web browser).

Figure 11:
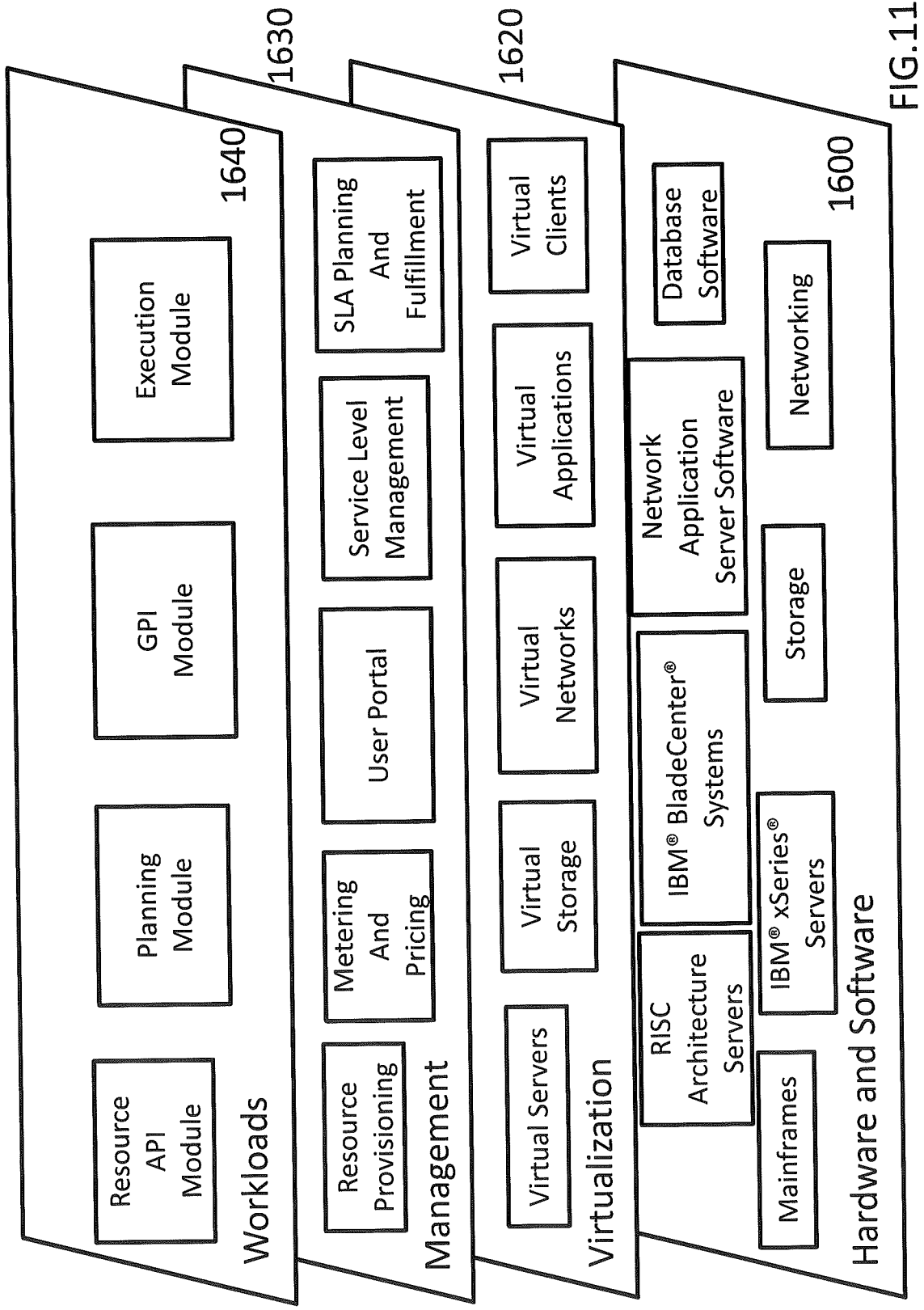
FIG. 11 depicts abstraction model layers according to an embodiment of the present invention.

Referring now to FIG. 11, a set of functional abstraction layers provided by cloud computing environment 1550 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for identifying semantically related records in a computer, comprising:
   receiving input data from an input device;
   splitting the input data into a plurality of clusters according to semantic relationship, each of the clusters including a plurality of source terms and a plurality of target terms;
   transforming each of the plurality of clusters based on a transformation which includes tokenization of the plurality of clusters, and removal of words, the tokenization of the plurality of clusters comprising semantically extending at least a word;
   for each of the plurality of clusters that are transformed, finding relatedness scores of a plurality of semantic relatedness measures with the plurality of target terms;
   building a vector of similarity scores for each of the plurality of target terms;
   for each of the plurality of source terms, selecting a predetermined number of the plurality of target terms for each of the plurality of source terms according to a magnitude of the vector of the similarity scores to provide a search result,
   wherein the splitting includes splitting the input data into the clusters that include terms that are more likely to semantically related with each other than other terms,
   wherein the search result is an output, and
   wherein the semantic extension includes extending the word into a plurality of words that are semantically related, further comprising selecting the source term with a highest magnitude of the vector of the similarity score as a match and repeating until a set of matches from all terms in a string of the source terms are determined; and treating the set of matches as a vector and computing a magnitude of a resulting vector as a similarity score between the input data with corresponding sets of terms.

2. The method according to claim 1, wherein the transformation includes the tokenization, conversion to lowercase, and removal of stop words, wherein smaller parts or individual words are semantically extended to a set of words that are related to an initial word from the plurality of clusters, and wherein when each word is extended in two sources, a whole set of extendable semantic relationship metrics is used to compute semantic distance between words that appear in two records of the two sources.

3. The method according to claim 2, wherein tokenization further comprises extending a first set of tokens to create an extended first set of tokens and a second set of tokens to create an extended second set of tokens based on a received semantic knowledge.

4. The method according to claim 3, further comprising receiving a set of weight values related to the extended first and second sets of extended tokens and calculating a similarity score for the extended first and second sets of extended tokens based on received weight values.

5. The method according to claim 1, wherein the transformation includes taking an initial input and breaking into smaller parts of the initial input, and taking smaller parts of terms and semantically extended to a set of words that are related to the initial input.

6. The method according to claim 5, wherein the smaller parts are semantically extended by dictionary or ontology.

7. The method according to claim 1 being an executable program stored in a computer readable medium and executed by a processor, wherein the relatedness scores of various semantic relatedness measures with all terms in another set to build the vector of similarity scores for each target term, and wherein for each record in source, the processor selects top-k (where k is an integer greater than zero) similar records in the target according to the similarity scores derived and return as output.

8. The method according to claim 1 being an executable program stored in a computer readable medium on cloud-based virtual server.

* * * * *